United States Patent
Tomita

(10) Patent No.: US 11,533,109 B2
(45) Date of Patent: Dec. 20, 2022

(54) OPTICAL COMMUNICATION SYSTEM, OPTICAL TRANSCEIVER, OPTICAL COMMUNICATION METHOD, AND NON-TRANSITORY COMPUTER READABLE MEDIUM

(71) Applicant: NEC Corporation, Tokyo (JP)

(72) Inventor: Isao Tomita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/439,920

(22) PCT Filed: Nov. 25, 2019

(86) PCT No.: PCT/JP2019/045951
§ 371 (c)(1),
(2) Date: Sep. 16, 2021

(87) PCT Pub. No.: WO2020/194859
PCT Pub. Date: Oct. 1, 2020

(65) Prior Publication Data
US 2022/0190924 A1 Jun. 16, 2022

(30) Foreign Application Priority Data
Mar. 27, 2019 (JP) .............................. JP2019-061886

(51) Int. Cl.
*H04B 10/50* (2013.01)
*H04B 10/073* (2013.01)
(Continued)

(52) U.S. Cl.
CPC ......... *H04B 10/506* (2013.01); *H04B 10/073* (2013.01); *H04B 10/572* (2013.01); *H04J 14/0258* (2013.01); *H04J 2203/0003* (2013.01)

(58) Field of Classification Search
None
See application file for complete search history.

(56) References Cited

U.S. PATENT DOCUMENTS

| 9,692,547 | B2 | 6/2017 | He |
| 9,917,671 | B2 | 3/2018 | Stracca et al. |
| 2007/0237177 | A1* | 10/2007 | Endo .................. H04Q 11/0071 370/468 |
| 2013/0004174 | A1* | 1/2013 | Lee ...................... H04B 10/272 398/79 |

(Continued)

FOREIGN PATENT DOCUMENTS

| JP | 2014-175817 A | 9/2014 |
| JP | 2017-504224 A | 2/2017 |

(Continued)

OTHER PUBLICATIONS

International Search Report for PCT Application No. PCT/JP2019/045951, dated Jan. 28, 2020.

*Primary Examiner* — Darren E Wolf

(57) ABSTRACT

A first optical transceiver outputs a first optical signal while switching the wavelength of the first optical signal to an optical fiber that acts as a medium for carrying single-fiber bi-directional communication between the first optical transceiver and an opposing second optical transceiver. When the wavelength of the first optical signal is switched to a receivable wavelength, the second optical transceiver identifies the wavelength of the received first optical signal, and outputs the second optical signal having a wavelength determined on the basis of the identification result to the optical fiber. When the first optical transceiver receives the second optical signal from the optical fiber, the first optical transceiver stops switching the wavelength of the first optical signal.

16 Claims, 9 Drawing Sheets

(51) Int. Cl.
*H04B 10/572* (2013.01)
*H04J 14/02* (2006.01)

(56) References Cited

U.S. PATENT DOCUMENTS

2014/0341574 A1* 11/2014 Yan .................... H04J 14/0265
398/49
2015/0200729 A1  7/2015 Seo et al.
2015/0373430 A1* 12/2015 Kim ................... H04Q 11/0067
398/48

FOREIGN PATENT DOCUMENTS

JP  2017504224 A * 2/2017
JP  2017-112519 A  6/2017

* cited by examiner

OPTICAL COMMUNICATION SYSTEM, OPTICAL TRANSCEIVER, OPTICAL COMMUNICATION METHOD, AND NON-TRANSITORY COMPUTER READABLE MEDIUM

This application is a National Stage Entry of PCT/JP2019/045951 filed on Nov. 25, 2019, which claims priority from Japanese Patent Application 2019-061886 filed on Mar. 27, 2019, the contents of all of which are incorporated herein by reference, in their entirety.

TECHNICAL FIELD

The present disclosure relates to an optical communication system, an optical transceiver, an optical communication method, and a program.

BACKGROUND ART

Patent Literature 1 describes a technology used after initiating operations in an optical communication system that communicates between optical transceivers. With the optical transceiver described in Patent Literature 1, a first optical signal is transmitted through a single optical path to an opposing optical transceiver, and a second optical signal is received through the optical path from the opposing optical transceiver. Additionally, with the optical transceiver described in Patent Literature 1, by acquiring first wavelength information included in the first optical signal and indicating the wavelength thereof, acquiring second wavelength information included in the second optical signal and indicating the wavelength thereof, and comparing the information, the wavelength separation interval between the first optical signal and the second optical signal is controlled.

On the other hand, with the optical communication system that communicates between optical transceivers, it is necessary to establish optical communication during system startup and when expanding or replacing optical transceivers. Additionally, the wavelength of the optical signals that can be transmitted and received by each optical transceiver is determined by the wavelength that is selectively passed by a port of a connected multiplexer/demultiplexer. Consequently, to establish communication between opposing optical transceivers, it is necessary to set an appropriate output wavelength according to the port to which each transceiver is connected.

Patent Literature 2 and 3 describe wavelength tuning technologies for setting an appropriate output wavelength in an optical transceiver. With the technology described in Patent Literature 2, loss of signal (LOS) information is exchanged between a first site having a plurality of fixed-wavelength optical transceivers and a second site having a plurality of adjustable-wavelength optical transceivers, and the second site adjusts the wavelength of the signal light to be outputted. The LOS information is superimposed on the signal light to be outputted by the first site as a low-frequency component. In the technology described in Patent Literature 2, in a case where the wavelength of the signal light from the second site is inappropriate (when the signal is not receivable), the first site transmits LOS information to the second site, and the second site continues to switch the wavelength while LOS information is being received from the first site. Then, in the case where the wavelength of the signal light from the second site is switched to a specific channel (when the signal becomes receivable), the first site stops outputting the LOS information, and the second site ends the wavelength switching control when the LOS information is no longer received from the first site.

Patent Literature 3 describes a technology for establishing a channel between an optical line termination (OLT) and an optical network termination (ONT) of a passive optical network (PON). With the technology described in Patent Literature 3, wavelength adjustment is executed in both terminal stations of the OLT and ONT. Specifically, the ONT outputs an optical signal at a certain wavelength to the OLT, and in the case of successfully receiving a response signal from the OLT within a first predetermined time, the ONT ends the control, whereas in the case of not receiving the response signal, the ONT switches the wavelength and outputs the optical signal to the OLT again. If the OLT successfully receives the optical signal from the ONT, the OLT outputs a response signal at a certain wavelength to the ONT, and in the case of successfully receiving an optical signal from the ONT within a second predetermined time, the OLT ends the control, whereas in the case of not receiving the optical signal, the OLT switches the wavelength and outputs the response signal to the ONT again.

CITATION LIST

Patent Literature

Patent Literature 1: Published Japanese Translation of PCT International Publication for Patent Application, No. 2017-504224
Patent Literature 2: U.S. Pat. No. 9,692,547B2
Patent Literature 3: U.S. Pat. No. 9,917,671B2

SUMMARY OF INVENTION

Technical Problem

As described above, with the technology described in Patent Literature 2, the setting of the wavelength is executed only by the optical transceiver at one (unilateral) terminal station, while the optical transceiver at the other terminal station is presumed to be set such that the output wavelength is fixed. Accordingly, with the technology described in Patent Literature 2, in the case where a certain optical transceiver at the other terminal station needs to be replaced, it is necessary to prepare an optical transceiver dedicated to the fixed wavelength of the certain optical transceiver, which leads to higher system management costs.

Also, with the technology described in Patent Literature 3, scanning that successively switches the wavelength is executed in both terminal stations, and therefore setting an appropriate wavelength in both terminal stations is hugely time-consuming, which leads to higher system management costs.

Accordingly, to reduce management costs in an optical communication system, it is desirable to reduce the time spent on setting the wavelength and also reduce the types of the optical transceivers to be prepared for replacement or expansion.

An object of the present disclosure is to provide an optical communication system, an optical transceiver, an optical communication method, and a program that address the above issue. The above issue is to reduce the time spent on setting the wavelength between optical transceivers during system startup or when expanding or replacing optical transceivers and also reduce the types of optical transceivers to be prepared for expansion or replacement in an optical communication system.

Solution to Problem

An optical communication system according to a first aspect of the present disclosure is provided with:
a first optical transceiver configured to output a first optical signal;
a second optical transceiver opposing the first optical transceiver and configured to output a second optical signal; and
an optical fiber that acts as a medium for carrying single-fiber bi-directional communication between the first optical transceiver and the second optical transceiver, wherein
the first optical transceiver outputs the first optical signal to the optical fiber while switching a wavelength of the first optical signal,
the second optical transceiver identifies the wavelength of the received first optical signal when the wavelength of the first optical signal is switched to a receivable wavelength, and outputs an optical signal having a wavelength determined on a basis of an identification result to the optical fiber as the second optical signal, and
when the first optical transceiver receives the second optical signal from the optical fiber, the first optical transceiver stops switching the wavelength of the first optical signal.

An optical transceiver according to a second aspect of the present disclosure is provided with:
an optical output unit configured to output a first optical signal to an optical fiber that acts as a medium for carrying single-fiber bi-directional communication between the optical transceiver itself and an opposing other optical transceiver;
a control unit configured to switch a wavelength of the first optical signal to be outputted by the optical output unit; and
an optical input unit configured to input a second optical signal from the optical fiber, the second optical signal having a wavelength pre-associated with the wavelength of the first optical signal and outputted when the other optical transceiver received the first optical signal,
wherein when the second optical signal is received by the optical input unit, the control unit stops switching the wavelength of the first optical signal.

An optical transceiver according to a third aspect of the present disclosure is provided with:
an optical input unit configured to input a first optical signal outputted while a wavelength of the first optical signal is switched, the first optical signal being outputted from an optical fiber that acts as a medium for carrying single-fiber bi-directional communication between the optical transceiver itself and an opposing other optical transceiver;
a control unit configured to identify the wavelength of the first optical signal successfully received by the optical input unit, and to determine a transmission wavelength on a basis of an identification result; and
an optical output unit configured to output a second optical signal having the transmission wavelength determined by the control unit to the optical fiber.

An optical transceiver according to a fourth aspect of the present disclosure is provided with:
an optical output unit configured to output a first optical signal to an optical fiber that acts as a medium for carrying single-fiber bi-directional communication between the optical transceiver itself and an opposing other optical transceiver;
a control unit configured to switch a wavelength of the first optical signal to be outputted by the optical output unit; and
an optical input unit configured to input a second optical signal from the optical fiber, the second optical signal having a wavelength pre-associated with the wavelength of the first optical signal and outputted when the other optical transceiver received the first optical signal, wherein
when the second optical signal is received by the optical input unit, the control unit stops switching the wavelength of the first optical signal,
the optical input unit inputs a third optical signal outputted while a wavelength of the third optical signal is switched from the optical fiber,
the control unit identifies the wavelength of the third optical signal successfully received by the optical input unit, and determines a transmission wavelength on a basis of an identification result,
the optical output unit outputs a fourth optical signal having the transmission wavelength determined by the control unit to the optical fiber,
the wavelength of the third optical signal that is receivable by the optical input unit is the wavelength of the second optical signal, and
the wavelength of the fourth optical signal determined by the control unit is the wavelength of the first optical signal that is receivable by the other optical transceiver.

An optical communication method according to a fifth aspect of the present disclosure includes:
a first outputting step, executed by a first optical transceiver, of outputting a first optical signal while switching a wavelength of the first optical signal to an optical fiber that acts as a medium for carrying single-fiber bi-directional communication between the first optical transceiver and an opposing second optical transceiver;
a second outputting step, executed by the second optical transceiver, of identifying the wavelength of the received first optical signal when the wavelength of the first optical signal is switched to a receivable wavelength, and outputting a second optical signal having a wavelength determined on a basis of an identification result to the optical fiber; and
a stopping step, executed by the first optical transceiver when the first optical transceiver receives the second optical signal from the optical fiber, of stopping the switching of the wavelength of the first optical signal.

A program according to a sixth aspect of the present disclosure is a program causing a control computer provided in an optical transceiver to execute a process including:
a switching step of switching a wavelength of a first optical signal to be outputted to an optical fiber that acts as a medium for carrying single-fiber bi-directional communication between the optical transceiver and an opposing other optical transceiver; and
a stopping step of stopping the switching of the wavelength of the first optical signal when the second optical signal having a wavelength pre-associated with the wavelength of the first optical signal and outputted when the other optical transceiver received the first optical signal is received.

A program according to a seventh aspect of the present disclosure is a program causing a control computer provided in an optical transceiver to execute a process including:
an identifying step of identifying a wavelength of a received first optical signal when the first optical signal outputted while switching the wavelength of the first optical signal is received from an optical fiber that acts as a medium for carrying single-fiber bi-directional communication between the optical transceiver and an opposing other optical transceiver;

a determining step of determining a transmission wavelength on a basis of an identification result from the identifying step; and a switching step of switching a wavelength of a second optical signal to be outputted to the optical fiber such that the wavelength of the second optical signal is the transmission wavelength determined in the determining step.

A program according to an eighth aspect of the present disclosure is a program causing a control computer provided in an optical transceiver to execute a process including:

a first switching step of switching a wavelength of a first optical signal to be outputted to an optical fiber that acts as a medium for carrying single-fiber bi-directional communication between the optical transceiver and an opposing other optical transceiver;

a stopping step of stopping the switching of the wavelength of the first optical signal when the second optical signal having a wavelength pre-associated with the wavelength of the first optical signal and outputted when the other optical transceiver received the first optical signal is received;

an identifying step of identifying a wavelength of a received third optical signal when the third optical signal outputted while switching the wavelength of the third optical signal is received from the optical fiber;

a determining step of determining a transmission wavelength on a basis of an identification result from the identifying step; and a second switching step of switching a wavelength of a fourth optical signal to be outputted to the optical fiber such that the wavelength of the fourth optical signal is the transmission wavelength determined in the determining step, wherein the wavelength of the third optical signal that is receivable from the optical fiber is the wavelength of the second optical signal, and the wavelength of the fourth optical signal determined in the determining step is the wavelength of the first optical signal that is receivable by the other optical transceiver.

Advantageous Effects of Invention

According to the present disclosure, an optical communication system, an optical transceiver, an optical communication method, and a program that address the above issue can be provided. In other words, according to the present disclosure, it is possible to reduce the time spent on setting the wavelength between optical transceivers during system startup or when expanding or replacing optical transceivers and also reduce the types of optical transceivers to be prepared for expansion or replacement in an optical communication system.

DESCRIPTION OF EMBODIMENTS

Hereinafter, example embodiments will be described with reference to the drawings. Note that in the example embodiments, identical or similar elements may be denoted with the same signs, and duplicate description of such elements may be omitted in some cases.

First Example Embodiment

Figure 1:
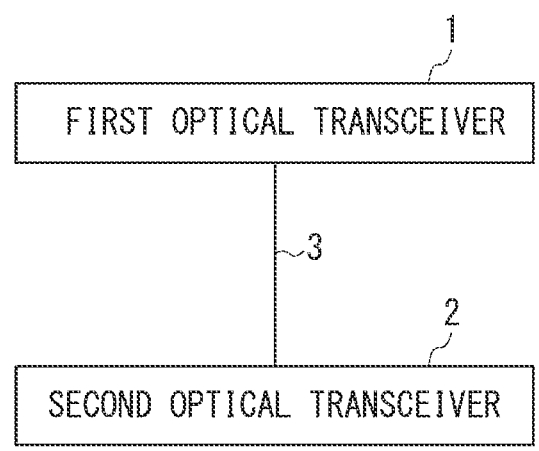
FIG. 1 is a diagram illustrating an example configuration of an optical communication system according to a first example embodiment.

An optical communication system according to the first example embodiment will be described with reference to FIGS. 1 to 3. FIG. 1 is a diagram illustrating an example configuration of an optical communication system according to the first example embodiment.

As illustrated in FIG. 1, the optical communication system according to the present example embodiment (hereinafter, the present system) is provided with a first optical transceiver 1, a second optical transceiver 2, and an optical fiber 3, and optical communication takes places between the first optical transceiver 1 and the second optical transceiver 2 which oppose each other.

The first optical transceiver 1 outputs a first optical signal. The second optical transceiver 2 opposes the first optical transceiver 1 and outputs a second optical signal. The optical fiber 3 is a medium for carrying single-fiber bi-directional communication between the first optical transceiver 1 and the second optical transceiver 2. In other words, the present system includes a portion where the first optical transceiver 1 and the second optical transceiver 2 are connected by the single optical fiber 3 acting as a single optical path. The first optical transceiver 1 and the second optical transceiver 2 can act as a first terminal station-side optical transceiver and a second terminal station-side optical transceiver, respectively, and two terminal stations are connected through the optical fiber 3.

FIG. 1 illustrates an example in which there is one set of the first optical transceiver 1 and the second optical transceiver 2, but the present system may include a plurality of sets (pairs) of a first terminal station-side optical transceiver and a second terminal station-side optical transceiver. Note that such as when expanding or replacing optical transceivers, situations may occur in which one half of a set is temporarily unavailable.

The plurality of sets all include a portion in which the optical transceivers in each set are connected by the single optical fiber 3 described above. For the optical communication in this portion, a wavelength-division multiplexing (WDM) transmission scheme is adopted. In other words, the present system includes a WDM transmission network that performs single-fiber bi-directional communication. For example, by providing the first terminal station side and the second terminal station side with a first multiplexer/demultiplexer and a second multiplexer/demultiplexer, respectively, and connecting the two multiplexer/demultiplexers through the single optical fiber 3, WDM communication can be performed.

In an optical communication system like the present system, the wavelength of the optical signals that can be transmitted and received by each optical transceiver can be determined by the wavelength that is selectively passed by a port of a connected multiplexer/demultiplexer. As an example, a case will be described in which the ports to which the first optical transceiver 1 and the second optical transceiver 2 are connected pass λ1 and λ2, respectively. In this case, when the first optical transceiver 1 outputs an optical signal with the wavelength λ1 as a first optical signal and the opposing second optical transceiver 2 outputs an optical signal with the wavelength λ2 as a second optical signal, optical communication is possible between the first optical transceiver 1 and the second optical transceiver 2. Note that in the present example embodiment and the example embodiments described later, wavelength can also be used to denote a certain range of wavelengths, which may be referred to as a wavelength band.

Additionally, to establish optical communication between opposite optical transceivers as described above in the operation initiation phase, it is necessary to set an appropriate wavelength in each optical transceiver. Here, the operation initiation phase refers to situations such as system startup and when replacing or expanding optical transceivers. Here, system startup refers to the launching of the system, and may also include rebooting.

To set the wavelength as above, a control like the following is executed in the present system.

First, the first optical transceiver 1 outputs the first optical signal to the optical fiber 3 while switching the wavelength. With this arrangement, the first optical transceiver 1 scans which wavelengths are outputtable to the optical fiber 3. Meanwhile, the second optical transceiver 2 is unable to receive the first optical signal until a receivable wavelength is set.

When the wavelength of the first optical signal is switched to a receivable wavelength (for example, the wavelength λ1), the second optical transceiver 2 identifies the wavelength of the received first optical signal. The second optical transceiver 2 outputs an optical signal having a wavelength (for example, the wavelength λ2) determined on the basis of the identification result to the optical fiber 3 as the second optical signal. Additionally, when the first optical transceiver 1 receives the second optical signal (in the example described above, an optical signal with the wavelength λ2) from the optical fiber 3, the first optical transceiver 1 stops switching the wavelength of the first optical signal. Obviously, the first optical transceiver 1 and the second optical transceiver 2 can take the opposite configuration, and may also be configured such that each optical transceiver is provided with both of the controls described as the control by each optical transceiver.

Next, a more specific exemplary configuration of each optical transceiver will be described with reference to FIG. 2. FIG. 2 is a block diagram illustrating an example configuration of the optical communication system in FIG. 1.

Figure 2:
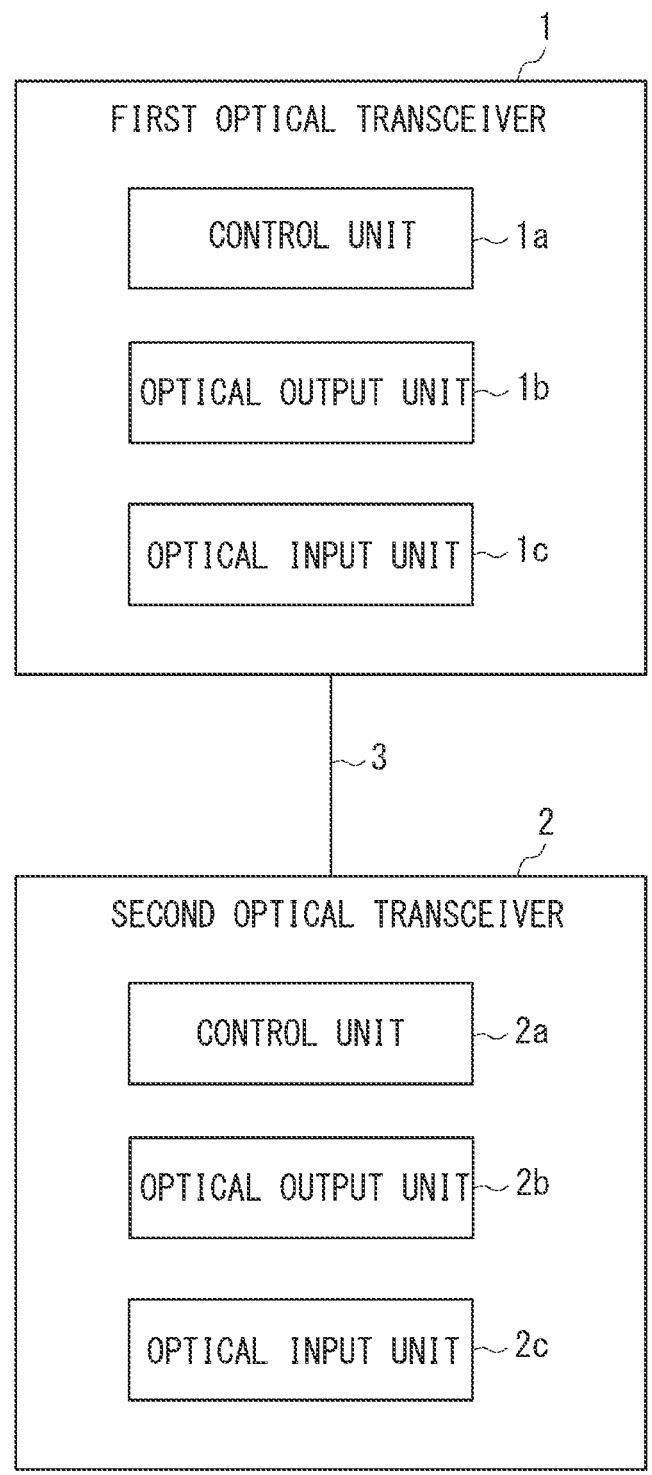
FIG. 2 is a block diagram illustrating an example configuration of the optical communication system in FIG. 1.
Figure 3:
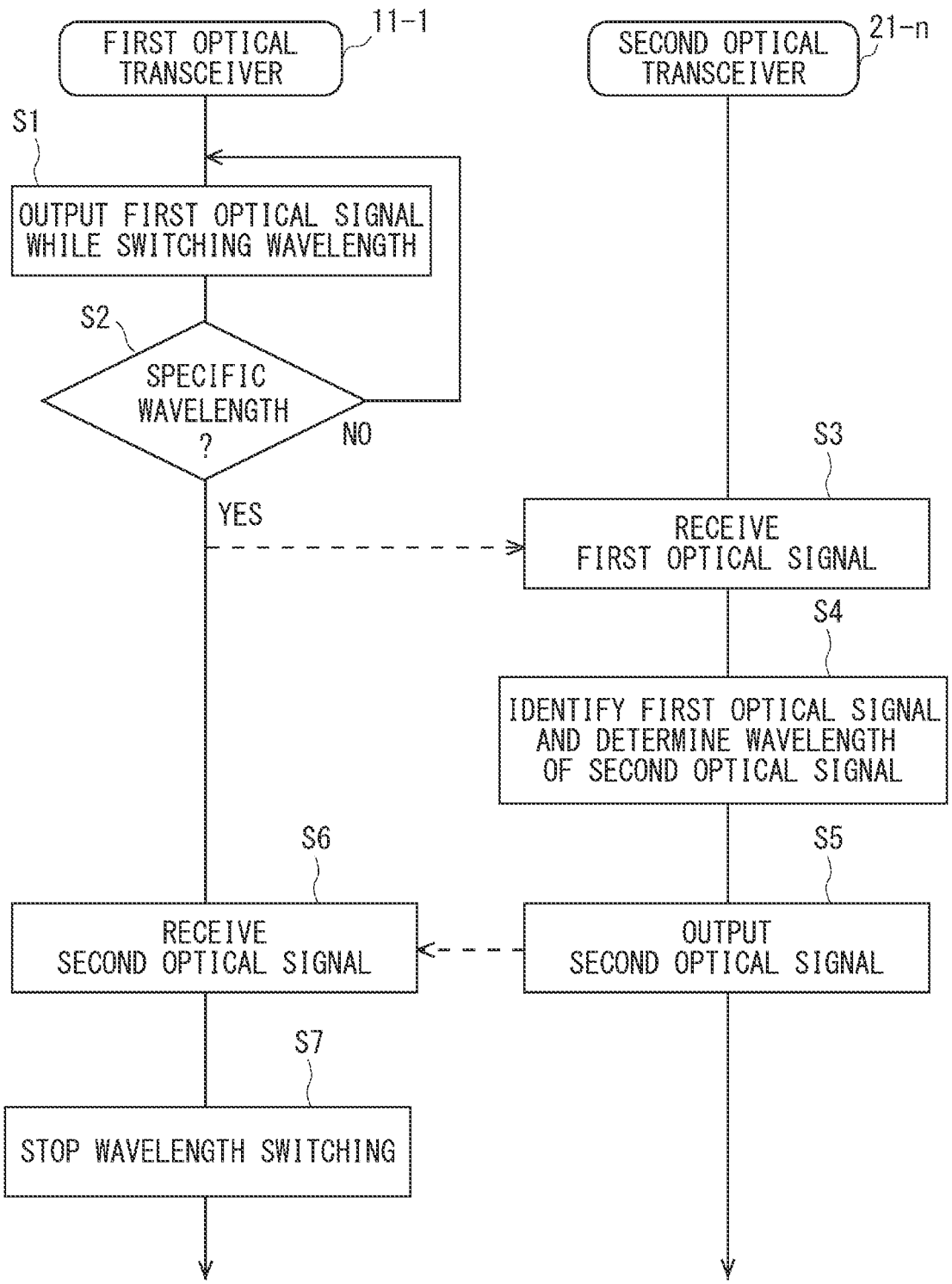
FIG. 3 is a flowchart for explaining an example of a wavelength setting process in the optical communication system according to the first example embodiment.

As illustrated in FIG. 2, the first optical transceiver 1 may be provided with a control unit 1a, an optical output unit 1b, and an optical input unit 1c. The optical output unit 1b outputs the first optical signal to the optical fiber 3 that acts as a medium for carrying single-fiber bi-directional communication between the optical transceiver itself and an opposing other optical transceiver (here, the second optical transceiver 2). The optical output unit 1b transmits optical signals, and therefore may also be referred to as a transmission unit. The optical output unit 1b can be configured to convert an electrical signal expressing information to be transmitted into an optical signal (first optical signal), and output the optical signal.

The control unit 1a switches the wavelength of the first optical signal to be outputted by the optical output unit 1b. The control unit 1a can be considered to be a component that controls the first optical transceiver 1 as a whole, including such switching control. For example, the control unit 1a can be achieved by components such as a central processing unit (CPU), a memory used as a workspace, and a non-volatile storage device storing a program for controlling the first optical transceiver 1 as a whole. In other words, the control unit 1a may include a control computer that incorporates the program in an executable way. Moreover, the control unit 1a can also be achieved by an integrated circuit, for example.

The optical input unit 1c inputs the second optical signal from the optical fiber 3, the second optical signal having a wavelength pre-associated with the wavelength of the first optical signal and outputted when the other optical transceiver (here, the second optical transceiver 2) received the first optical signal. An example of the association will be described later in the second example embodiment. The optical input unit 1c receives optical signals, and therefore may also be referred to as a reception unit. When the second optical signal is received by the optical input unit 1c, the control unit 1a stops switching the wavelength of the first optical signal. The optical input unit 1c can be configured to receive information by inputting the second optical signal and converting the second optical signal to electrical signal.

The program built into the control unit 1a described above causes the control computer to execute the following first switching step and stopping step. The first switching step switches the wavelength of the first optical signal outputted to the optical fiber 3. The stopping step stops the switching of the wavelength of the first optical signal when the second optical signal having a wavelength pre-associated with the wavelength of the first optical signal and outputted when the second optical transceiver 2 received the first optical signal is received.

As illustrated in FIG. 2, the second optical transceiver 2 may be provided with a control unit 2a, an optical output unit 2b, and an optical input unit 2c. The optical input unit 2c inputs the first optical signal outputted while switching the wavelength from the optical fiber 3 that acts as a medium for carrying single-fiber bi-directional communication between the optical transceiver itself and an opposing other optical transceiver (here, the first optical transceiver 1). The optical input unit 2c receives optical signals, and therefore may also be referred to as a reception unit. The optical input unit 2c can be configured to receive information by inputting the first optical signal and converting the first optical signal to electrical signal.

The control unit 2a identifies the wavelength of the first optical signal successfully received by the optical input unit 2c, and determines a transmission wavelength on the basis of the identification result. The control unit 2a can be considered to be a component that controls the second optical transceiver 2 as a whole, including such identification and determination control. For example, the control unit 2a can be achieved by components such as a CPU, a memory used as a workspace, and a non-volatile storage device storing a program for controlling the second optical transceiver 2 as a whole. In other words, the control unit 2a may include a control computer that incorporates the program in an executable way. Moreover, the control unit 2a can also be achieved by an integrated circuit, for example.

The optical output unit 2b outputs the second optical signal having the transmission wavelength determined by the control unit 2a to the optical fiber 3. The optical output unit 2b transmits optical signals, and therefore may also be referred to as a transmission unit. The optical output unit 2b can be configured to convert an electrical signal expressing information to be transmitted into an optical signal (second optical signal), and output the optical signal.

The program built into the control unit 2a described above causes the control computer to execute the following identifying step, determining step, and second switching step. The identifying step identifies the wavelength of the received first optical signal when the first optical signal outputted while switching the wavelength is received from the optical fiber 3. The determining step determines the transmission wavelength on the basis of the identification result from the identifying step. The second switching step switches the wavelength of the second optical signal to be outputted to the optical fiber 3 to the transmission wavelength determined in the determining step.

Next, an example of a wavelength setting process in an optical communication system according to the present example embodiment will be described with reference to FIG. 3. FIG. 3 is a flowchart for explaining an example of the wavelength setting process.

First, when the first optical transceiver 1 is connected, the first optical transceiver 1 selects a wavelength from among a plurality of wavelengths, and outputs the first optical signal to the optical fiber 3 while successively switching to the selected wavelength (step S1). When the wavelength of the first optical signal becomes a specific wavelength (herein designated λ1) as a result of switching the wavelength (step S2, YES), the first optical signal is receivable by the second optical transceiver 2. Consequently, at this time, the second optical transceiver 2 receives the first optical signal from the optical fiber 3 (step S3).

The second optical transceiver 2 identifies the wavelength of the first optical signal, determines the wavelength of the second optical signal that the second optical transceiver 2 itself should output (step S4), and outputs the second optical signal having the determined wavelength to the optical fiber 3 (step S5). The first optical transceiver 1 receives the second optical signal (step S6), and thereby stops switching the wavelength (locks the wavelength at λ1) (step S7).

As above, the present system has a wavelength control mechanism that makes it possible to specify which wavelengths should be outputted by each optical transceiver while still allowing variable wavelengths in the optical transceivers at either opposing terminal station in a WDM transmission network, and thereby establishes communication at an appropriate wavelength.

According to such a configuration, in the present system, it is possible to reduce the time spent on setting the wavelength between optical transceivers during system startup or when expanding or replacing optical transceivers, and also reduce the types of optical transceivers to be prepared for expansion or replacement. Consequently, in the present system, the management costs of the system can be reduced.

Such effects will be described specifically. First, to reduce the optical transceiver management costs, it is desirable to take a configuration that allows variable wavelength optical transceivers to be adopted in either terminal station and reduces the types of optical transceivers to be prepared. Regarding this point, in the present example embodiment, the first optical transceiver 1 has a variable wavelength configuration that outputs an optical signal while switching the wavelength, and likewise the second optical transceiver 2 has a variable wavelength configuration that determines the transmission wavelength on the basis of the wavelength that is received successfully. In this way, each optical transceiver in the present system is capable of selectively switching the wavelength to output an optical signal, and is capable of determining (recognizing) a port that is not determined because of an unknown wavelength during startup in each optical transceiver. With this arrangement, in the present system, wavelength adjustment (wavelength tuning) can be executed to set an appropriate wavelength according to the connected port, without setting the wavelength that each optical transceiver should output in advance in both terminal stations. Consequently, during expansion, replacement, or the like, an appropriate wavelength can be set automatically by simply connecting each optical transceiver to a port, for example, without having a worker consciously or intentionally decide which port each optical transceiver should be connected to.

Furthermore, in the case of adopting an optical transceiver with a variable wavelength configuration in both terminal stations, it is desirable to reduce the number of man-hours and time for setting an appropriate wavelength in both terminal stations. Regarding this point, in the present example embodiment, because the opposing optical transceiver identifies the received wavelength and decides the wavelength that the optical transceiver itself should output, wavelength tuning is possible without having to perform wavelength switching, and the time spent on setting wavelengths for the system as a whole can be reduced. In other words, in the present example embodiment, wavelengths can be set in a shorter amount of time compared to performing a scan in both terminal stations.

Additionally, in the communication between antenna stations and terminal stations (mobile fronthaul communication) in 5G networks, for example, WDM transmission is applied, and an optical transceiver that outputs optical signals is provided in each base station. Optical signals are transmitted and received between opposing optical transceivers through the single optical fiber 3 (single-fiber bidirectional communication). The present example embodiment can also be usefully applied to such mobile fronthaul communication.

Here, an optical transceiver having a configuration provided with both of the controls described as the control by each optical transceiver will be described briefly. Note that although an example of configuring the first optical transceiver 1 with such a configuration is described, a similar configuration may also be adopted in the second optical transceiver 2. The first optical transceiver 1 in this configuration is obtained by causing the control unit 1a, the optical output unit 1b, and the optical input unit 1c to additionally execute the controls in the control unit 2a, the optical output unit 2b, and the optical input unit 2c (to additionally have the functions of the units 2a, 2b, and 2c), respectively.

First, the control in the case of newly connecting the first optical transceiver 1 is as follows, as described earlier. Namely, the optical output unit 1b outputs the first optical signal to the optical fiber 3, and the control unit 1a switches the wavelength of the first optical signal to be outputted by the optical output unit 1b. The optical input unit 1c inputs the second optical signal from the optical fiber 3, the second optical signal having a wavelength pre-associated with the wavelength of the first optical signal and outputted when the other optical transceiver (here, the second optical transceiver 2) received the first optical signal. When the second optical signal is received by the optical input unit 1c, the control unit 1a stops switching the wavelength of the first optical signal.

Next, the control in the case where the first optical transceiver 1 has already been connected will be described. The control is as follows, as described as the control by the second optical transceiver 2. Namely, the optical input unit 1c inputs a third optical signal outputted while switching the wavelength from the optical fiber 3. The control unit 1a identifies the wavelength of the third optical signal successfully received by the optical input unit 1c, and determines a transmission wavelength on the basis of the identification result. The optical output unit 1b outputs a fourth optical signal having the transmission wavelength determined by the control unit 1a to the optical fiber 3.

In the description here, the names of the optical signals have been changed, but the wavelength of the third optical signal successfully received by the optical input unit 1c is the wavelength of the second optical signal, and the wavelength of the fourth optical signal determined by the control unit 1a is the wavelength of the first optical signal successfully received by the other optical transceiver described above.

The control computer provided in the first optical transceiver 1 in such a configuration may incorporate a program like the following in an executable way. In other words, the program causes the control computer to execute the first switching step, the stopping step, the identifying step, the determining step, and the second switching step described above. Note that the identifying step, the determining step, and the second switching step are basically similar to the steps described earlier, and only the names of the optical signals have been changed.

By adopting such a configuration, a common configuration can be attained for the optical transceivers on both the first terminal station side and the second terminal station side. In addition, the optical transceiver having both functions as describe here can also be applied to the examples described in the example embodiments described later.

At this point, a supplemental description of an optical communication method in the present system will be given. As described in the wavelength setting process, the present system is capable of executing an optical communication method including a first outputting step, a second outputting step, and a stopping step as follows. In the first outputting step, the first optical transceiver 1 outputs the first optical signal while switching the wavelength to the optical fiber 3 that acts as a medium for carrying single-fiber bi-directional communication between the first optical transceiver 1 and the opposing second optical transceiver 2. In the second outputting step, the second optical transceiver 2 identifies the wavelength of the received first optical signal when the wavelength of the first optical signal is switched to a receivable wavelength, and outputs the second optical signal having a wavelength determined on the basis of the identification result to the optical fiber 3. In the stopping step, when the first optical transceiver 1 receives the second optical signal from the optical fiber 3, the first optical transceiver 1 stops switching the wavelength of the first optical signal. Other examples are as described above, and can also be applied to the examples described in the example embodiments described later.

Second Example Embodiment

Figure 4:
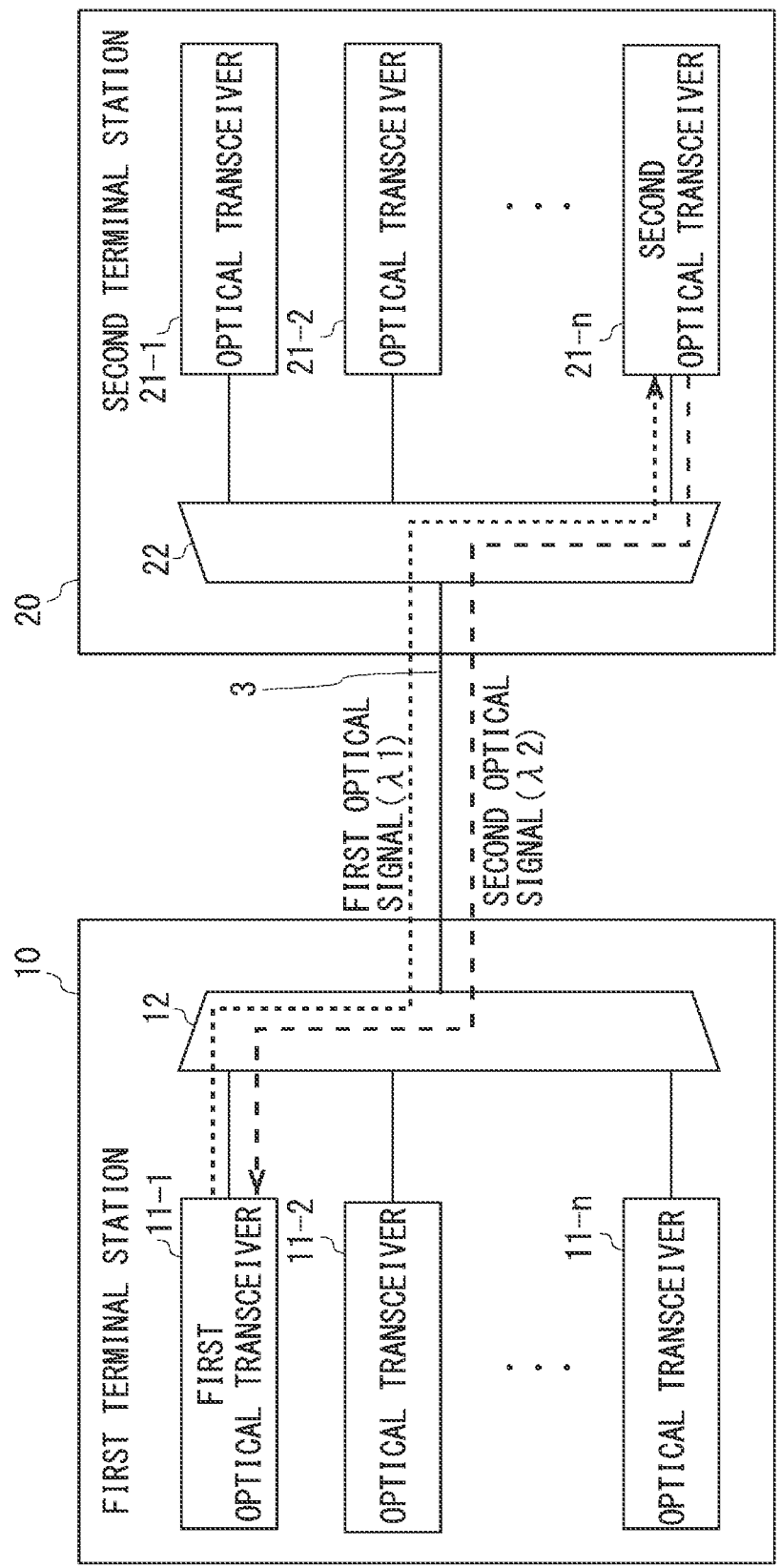
FIG. 4 is a block diagram illustrating an example configuration of an optical communication system according to a second example embodiment.
Figure 5:
FIG. 5 is a diagram illustrating an example of a correspondence table stored in an optical transceiver in the optical communication system in FIG. 4.
Figure 6:
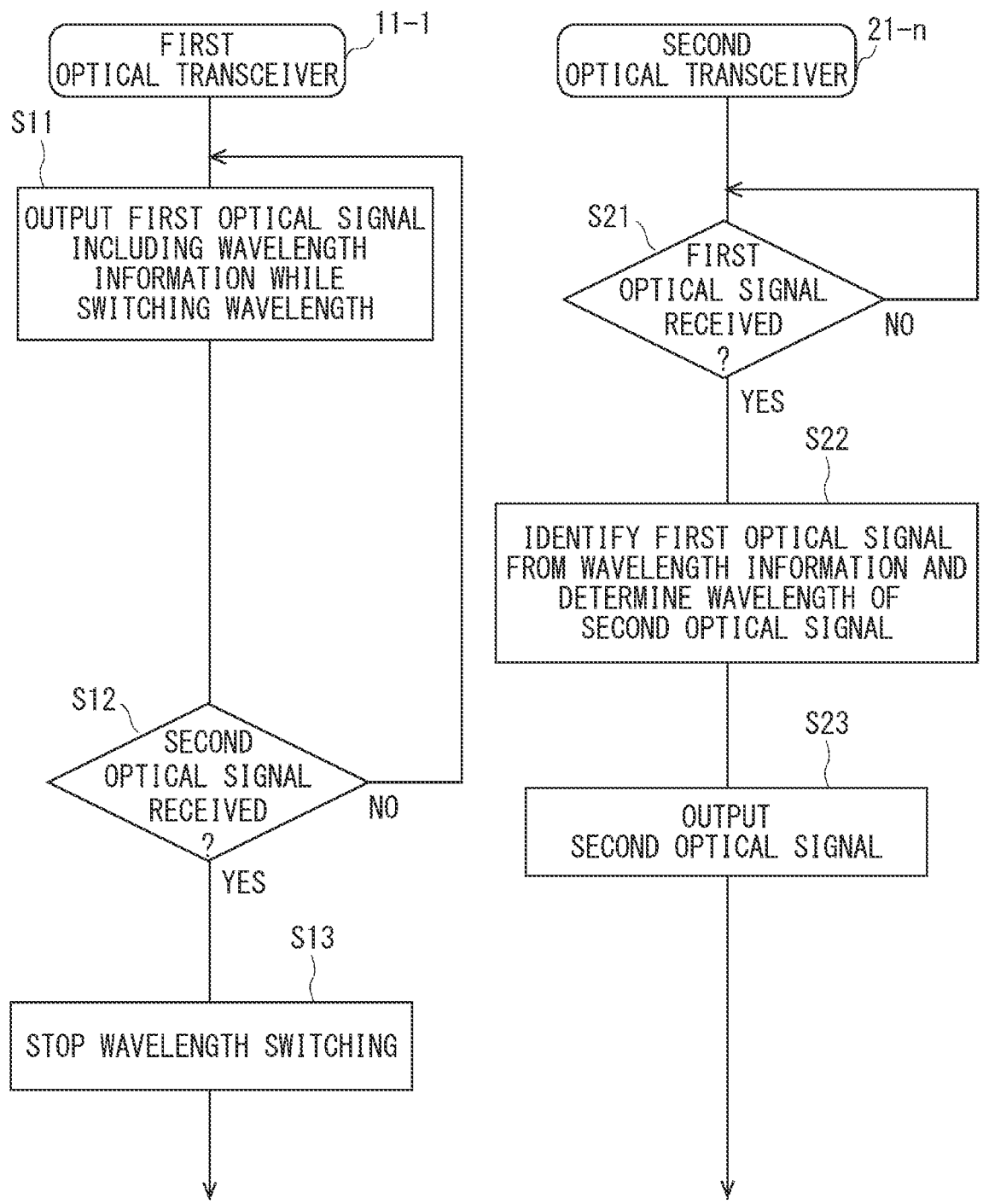
FIG. 6 is a flowchart for explaining an example of a wavelength setting process in the optical communication system according to the second example embodiment.

In the second example embodiment, the differences from the first example embodiment will be described mainly with reference to FIGS. 4 to 6, but the various examples described in the first example embodiment are applicable. FIG. 4 is a block diagram illustrating an example configuration of an optical communication system according to the second example embodiment, and FIG. 5 is a diagram illustrating an example of a correspondence table stored in an optical transceiver in the optical communication system in FIG. 4.

As illustrated in FIG. 4, in the optical communication system according to the present example embodiment (hereinafter, the present system) a first terminal station 10 and a second terminal station 20 are connected by a single optical fiber 3. Additionally, the first terminal station 10 is provided with n (where n is a positive integer) optical transceivers 11-1 to 11-n, and a first multiplexer/demultiplexer 12 connected to the optical transceivers. The second terminal station 20 is provided with n optical transceivers 21-1 to 21-n, and a second multiplexer/demultiplexer 22 connected to the optical transceivers. In the following, the optical transceivers 11-1 to 11-n will be designated the optical transceivers 11 when not being distinguished individually, and the optical transceivers 21-1 to 21-n will be designated the optical transceivers 21 when not being distinguished individually.

The optical fiber 3 is disposed between the first multiplexer/demultiplexer 12 and the second multiplexer/demultiplexer 22. The first multiplexer/demultiplexer 12 and the second multiplexer/demultiplexer 22 both may be configured using an arrayed waveguide grating (AWG), for example. Additionally, optical signals are transmitted and received between the opposing optical transceivers 11 and 21 through the first multiplexer/demultiplexer 12 and the second multiplexer/demultiplexer 22. The optical signals outputted from each of the optical transceivers 11 or 21 are multiplexed, transmitted over the optical fiber 3 of an optical fiber network, demultiplexed by the multiplexer/demultiplexer at the opposing station, and then received by the opposing optical transceivers 21 or 11. The same applies to communication in the opposite direction.

In addition, a situation will be described in which the optical transceiver 11-1 is an optical transceiver on the first terminal station 10 side that is newly connected due to replacement or expansion, and the already-connected optical transceiver 21-n is the optical transceiver on the second terminal station 20 side that opposes the first optical transceiver 11-1. In other words, a situation will be described in which the first optical transceiver 11-1 is newly connected in a state where the optical transceivers 11-2 to 11-n are already connected to respective ports of the first multiplexer/demultiplexer 12 and the optical transceivers 21-1 to 21-n are already connected to respective ports of the second multiplexer/demultiplexer 22. Note that even in the case where a plurality of optical transceivers are newly connected at the same time, the following description can be cited similarly if the opposing optical transceivers are already connected.

For example, the configuration of the first optical transceiver 11-1 may be similar to the first optical transceiver 1 in FIG. 2 and the configuration of the second optical transceiver 21-n may be similar to the second optical transceiver 2 in FIG. 2, but both functions may also be included in either configuration. The same also applies to the other optical transceivers 11-2 to 11-n and 21-1 to 21-(n−1). In other words, for these optical transceivers, one of either the optical transceivers on the first terminal station 10 side or the opposing optical transceivers on the second terminal station 20 side may include the functions of the first optical transceiver 1 in FIG. 2 while the other may include the functions of the second optical transceiver 2 in FIG. 2. Furthermore, both functions may also be included in all of the optical transceivers.

The wavelengths that the first optical transceiver 11-1 is capable of transmitting and receiving are determined according to the port of the first multiplexer/demultiplexer 12 to which the first optical transceiver 11-1 is connected. Here, let $\lambda 1$ be the wavelength that can be transmitted (the transmission wavelength, or in other words, the output wavelength) on the port of the first multiplexer/demultiplexer 12 to which the first optical transceiver 11-1 is connected, and let $\lambda 2$ be the wavelength that can be received (the reception wavelength, or in other words, the input wavelength) on the port. In other words, the first multiplexer/demultiplexer 12 is assumed to have a port on which an optical signal with the wavelength $\lambda 1$ is inputtable from the first optical transceiver 11-1 and also on which an optical signal with the wavelength $\lambda 2$ is outputtable to the first optical transceiver 11-1.

The first optical transceiver 11-1 is configured to select a wavelength from among a plurality of wavelengths and output an optical signal while successively switching the wavelength at predetermined intervals, for example. As described above, the wavelengths that can be inputted and outputted on each port in the first multiplexer/demultiplexer 12 are assumed to be fixed, and also different from each other. Note that each of the ports to which the other optical transceivers 11-2 to 11-$n$ are connected is capable of passing optical signals with a transmission wavelength and a reception wavelength that are different from $\lambda 1$ and $\lambda 2$, and also different from each other.

The wavelengths that the second optical transceiver 21-$n$ is capable of transmitting and receiving are determined according to the port of the second multiplexer/demultiplexer 22 to which the second optical transceiver 21-$n$ is connected. Here, the case where the second optical transceiver 21-$n$ is the optical transceiver that communicates in opposition with the first optical transceiver 11-1 is being described, and therefore the transmission wavelength is $\lambda 2$ and the reception wavelength is $\lambda 1$. In other words, the second multiplexer/demultiplexer 22 has a port on which an optical signal with the wavelength $\lambda 2$ is inputtable from the second optical transceiver 21-$n$ and also on which an optical signal with the wavelength $\lambda 1$ is outputtable to the second optical transceiver 21-$n$. The wavelengths that can be inputted and outputted on each port in the second multiplexer/demultiplexer 22 likewise are assumed to be fixed, and also different from each other.

Thereafter, the second optical transceiver 21-$n$ identifies the wavelength of the first optical signal inputted from the first optical transceiver 11-1, determines the wavelength that the second optical transceiver 21-$n$ itself should output on the basis of the identified wavelength, and outputs an optical signal (second optical signal) at the determined wavelength. Also, the first optical transceiver 11-1 receives the second optical signal and stops switching the wavelength (locks the wavelength at $\lambda 1$).

In the present example embodiment, the first optical transceiver 11-1 can be configured to output the first optical signal including information (first information) indicating the wavelength of the first optical signal to the optical fiber 3. In the example of FIG. 2, the optical output unit 1$b$ outputs the first optical signal including the first information to the optical fiber 3. The first information can be included as header information or the like of the first optical signal, for example. In this way, in the present example embodiment, the wavelength at the time of output can be included in the first optical signal.

The second optical transceiver 21-$n$ opposing the first optical transceiver 11-1 is capable of identifying the wavelength of the received first optical signal on the basis of the first information, and determining a wavelength on the basis of the identification result. In the example of FIG. 2, the control unit 2$a$ identifies the wavelength of the first optical signal received from the first optical transceiver 11-1 on the basis of information included in the first optical signal.

In addition, the second optical transceiver 21-$n$ preferably includes a storage unit that stores correspondence relationships between reception wavelengths (input wavelengths) and transmission wavelengths (output wavelengths). The storage unit may be provided in the control unit 2$a$ in FIG. 2, for example. Also, correspondence relationships can be stored as a table, like the table 50 illustrated in FIG. 5 for example. The table 50 states correspondence relationships such as a correspondence between $\lambda 1$-1 and $\lambda 2$-1 and a correspondence between $\lambda 1$-2 and $\lambda 2$-2.

Additionally, on the basis of the identification result and the correspondence relationships, the second optical transceiver 21-$n$, such as the control unit 2$a$ for example, is configured to determine the transmission wavelength corresponding to the reception wavelength that matches the wavelength indicated by the identification result as the wavelength of the second optical signal.

Next, an example of a wavelength setting process in an optical communication system according to the present example embodiment will be described with reference to FIG. 6. FIG. 6 is a flowchart for explaining an example of the wavelength setting process. Note that because a chronological sequence is illustrated, the flow in FIG. 6 is illustrated according to a different notation method than FIG. 3.

First, when the first optical transceiver 11-1 is connected to the first multiplexer/demultiplexer 12, the first optical transceiver 11-1 selects a wavelength from among a plurality of wavelengths, and outputs the first optical signal including information indicating the selected wavelength (step S11). Next, the first optical transceiver 11-1 determines whether or not the second optical signal has been received from the opposing second optical transceiver 21-$n$ (step S12), and if not (the NO case), the first optical transceiver 11-1 returns to step S11 and selects the next wavelength (step S13). At the point when the determination becomes YES in step S12, the wavelength switching is stopped (the wavelength is locked at $\lambda 1$-1) (step S13).

The second optical transceiver 21-$n$ is capable of receiving the first optical signal when the wavelength of the first optical signal becomes a specific wavelength ($\lambda 1$-1) as a result of switching the wavelength and outputting the first optical signal in step S11. Consequently, the second optical transceiver 21-$n$ determines whether or not the first optical signal has been received (step S21). In the case of YES in step S21, the second optical transceiver 21-$n$ reads the wavelength ($\lambda 1$-1) from the information included in the first optical signal and references the table 50 to determine the wavelength ($\lambda 2$-1) pre-associated with the read wavelength as the output wavelength (step S22). Next, the second optical transceiver 21-$n$ outputs the second optical signal having the determined wavelength ($\lambda 2$-1) (step S23).

As is apparent from the above description, according to the present example embodiment, the effects of the first example embodiment are exhibited, and furthermore, the reception wavelength can be distinguished easily in the opposing second optical transceiver 21-$n$ without depending on a process such as wavelength analysis. Also, in the present example embodiment, wavelength information is not delivered to both opposing sides, but instead, wavelength tuning can be performed on one side by using wavelength information from the other side as a trigger. Furthermore, according to the present example embodiment, by storing correspondence relationships in advance, the wavelength can be set appropriately, irrespectively of which ports in which terminal stations the optical transceivers 11 and 21 are connected to.

The description of the above example presumes that each port in the first multiplexer/demultiplexer 12 and the second multiplexer/demultiplexer 22 is a transmitting/receiving port. One example of such a transmitting/receiving port is a bi-directional optical sub-assembly (BOSA). Furthermore, the description of the above example presumes that a multiplexer/demultiplexer and an optical transceiver are connected by a single fiber. In other words, the first multiplexer/demultiplexer 12 is presumed to have a transmitting/receiving port for connecting to the first optical transceiver 11-1, and the second multiplexer/demultiplexer 22 is presumed to have a transmitting/receiving port for connecting to the second optical transceiver 21-$n$. In this case, as described above, the wavelengths that can be transmitted and received by the first optical transceiver 11-1 are prescribed according to the transmitting/receiving port of the first multiplexer/demultiplexer 12 to which the first optical transceiver 11-1 is connected. Furthermore, the wavelengths that can be transmitted and received by the second optical transceiver 21-$n$ are prescribed according to the transmitting/receiving port of the second multiplexer/demultiplexer 22 to which the second optical transceiver 21-$n$ is connected. The same applies to the other optical transceivers 11 and 21.

On the other hand, the transmitting port and the receiving port may also be configured separately, and a multiplexer/demultiplexer and an optical transceiver may also be connected by two fibers. For example, the transmitting port may be a transmitter optical sub-assembly (TOSA), and the receiving port may be a receiver optical sub-assembly (ROSA). In other words, the first multiplexer/demultiplexer 12 may have a transmitting port and a receiving port for connecting to the first optical transceiver 11-1, and the second multiplexer/demultiplexer 22 may have a transmitting port and receiving port for connecting to the second optical transceiver 21-$n$. In this case, the respective wavelengths that can be transmitted from the first optical transceiver 11-1 and received by the first optical transceiver 11-1 are prescribed according to the transmitting port and the receiving port of the first multiplexer/demultiplexer 12 to which the first optical transceiver 11-1 is connected. Also, the respective wavelengths that can be transmitted from the second optical transceiver 21-$n$ and received by the second optical transceiver 21-$n$ are prescribed according to the transmitting port and the receiving port of the second multiplexer/demultiplexer 22 to which the second optical transceiver 21-$n$ is connected. The same applies to the other optical transceivers 11 and 21.

Third Example Embodiment

Figure 7:
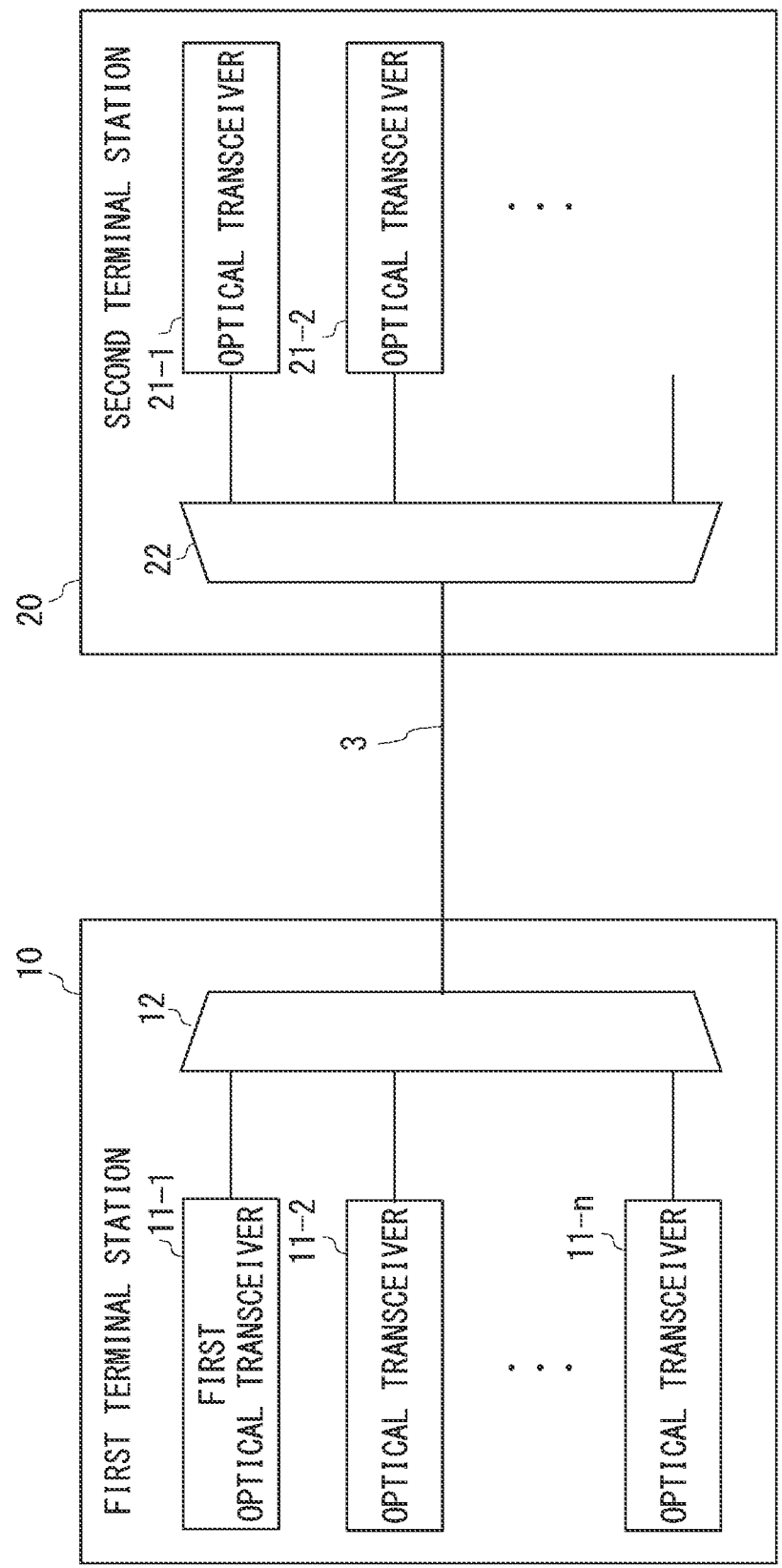
FIG. 7 is a block diagram illustrating an example configuration of an optical communication system according to a third example embodiment.
Figure 8:
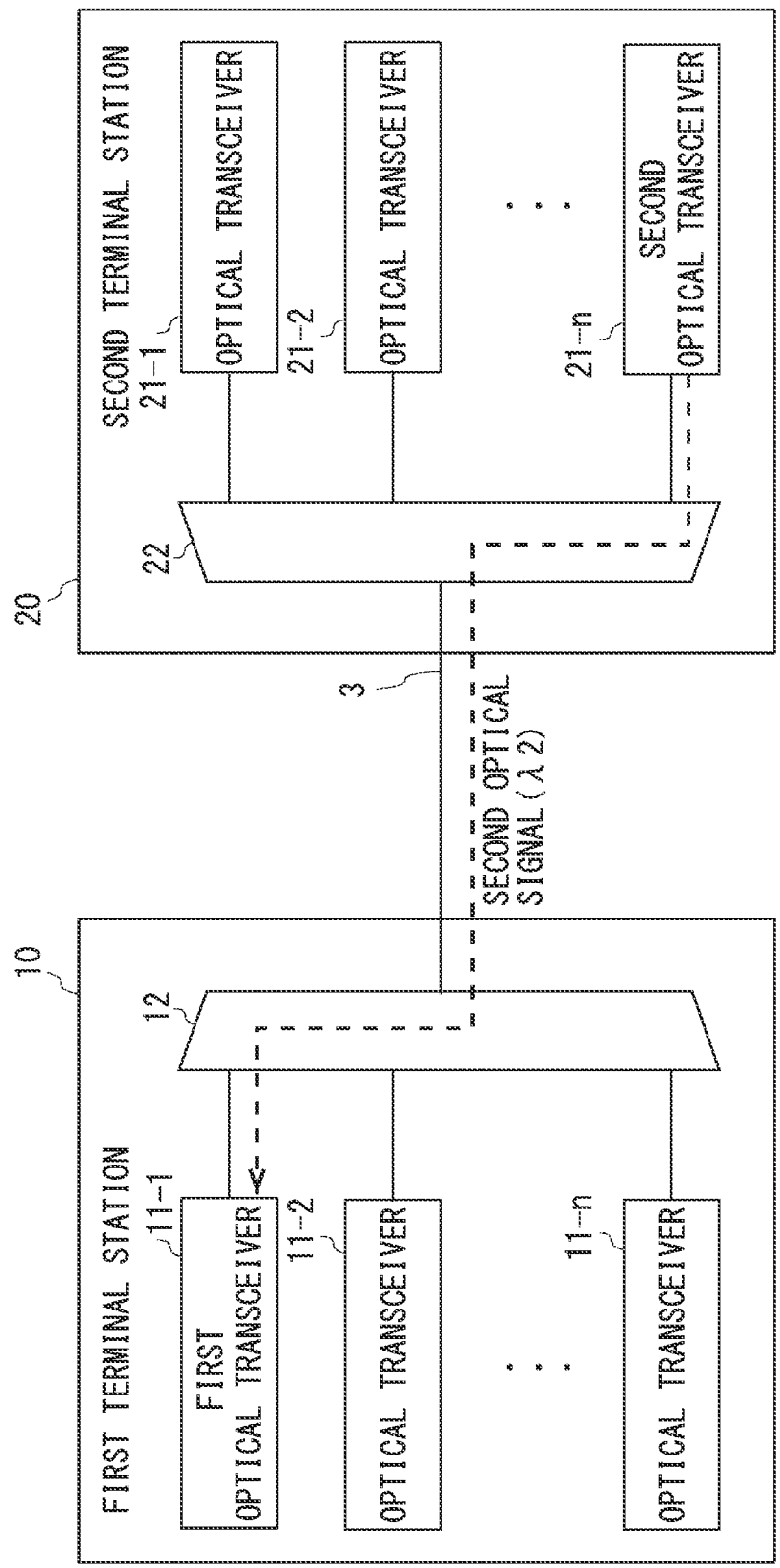
FIG. 8 is a block diagram illustrating an example configuration of the optical communication system according to the third example embodiment.

In the third example embodiment, the differences from the second example embodiment will be described mainly with reference to FIGS. 7 and 8. However, the various examples described in the first and second example embodiments are applicable to the third example embodiment where appropriate. FIGS. 7 and 8 are block diagrams illustrating an example configuration of an optical communication system according to the third example embodiment, in which FIG. 7 is an example illustrating a case where an opposing optical transceiver does not exist, and FIG. 8 is an example illustrating the point in time when an opposing optical transceiver is connected.

As illustrated in FIG. 7, the present example embodiment describes a case where, when the first optical transceiver 11-1 is connected on the first terminal station 10 side, an opposing optical transceiver does not exist on the second terminal station 20 side.

The first optical transceiver 11-1 in the present example embodiment stops outputting the first optical signal in the case where the second optical signal is not received successfully from the optical fiber 3 even after executing the wavelength switching a predetermined number of times. In other words, of the two optical transceivers that oppose each other in the first terminal station 10 and the second terminal station 20, the one that is connected to a port starts a scan like the above. Here, to illustrate an example of a case where there are 10 sets of wavelengths, the predetermined number of times may be 10 times to cycle through $\lambda1$-1 to $\lambda1$-10, a fewer number such as two times or five times, or m cycles (where m is a positive integer) through $\lambda1$-1 to $\lambda1$-10, for example. Additionally, in the case where the second optical signal is not received successfully, the first optical transceiver 11-1 enters a standby state to wait until an optical transceiver opposing the first optical transceiver 11-1 is connected in the second terminal station 20.

In such a standby state (that is, after the output of the first optical signal is stopped), if the second optical transceiver 21-$n$ opposing the first optical transceiver 11-1 in the standby state is connected as illustrated in FIG. 8, a control like the following is executed. Namely, the connected second optical transceiver 21-$n$ outputs the second optical signal to the optical fiber 3 while switching the wavelength of the second optical signal. Thereafter, the first optical transceiver 11-1 identifies the wavelength of the received second optical signal when the wavelength of the second optical signal is switched to a receivable wavelength, and outputs an optical signal having a wavelength determined on the basis of the identification result to the optical fiber 3 as the first optical signal. Furthermore, when a state like the one illustrated in FIG. 4 is reached, or in other words when the second optical transceiver 21-$n$ receives the first optical signal from the optical fiber 3, the second optical transceiver 21-$n$ stops switching the wavelength of the second optical signal.

Also, in the present example embodiment, the second optical transceiver 21-$n$ likewise preferably includes a storage unit that stores correspondence relationships between reception wavelengths and transmission wavelengths. Additionally, on the basis of the identification result and the correspondence relationships, the second optical transceiver 21-$n$ preferably determines the transmission wavelength corresponding to the reception wavelength that matches the wavelength indicated by the identification result as the wavelength of the second optical signal. Also, in the present example embodiment, the first optical transceiver 11-1 likewise preferably includes a storage unit that stores the correspondence relationships. Similarly, on the basis of the identification result and the correspondence relationships stored in the storage unit, the first optical transceiver 11-1 also preferably determines the transmission wavelength corresponding to the reception wavelength that matches the wavelength indicated by the identification result as the wavelength of the first optical signal.

As above, according to the present example embodiment, in addition to the effects provided by the first or the second example embodiment, even in the case where an optical transceiver is connected but an opposing optical transceiver has not been connected at the time, the optical transceiver is capable of waiting for the connection and setting a wavelength. Furthermore, according to the present example embodiment, by storing correspondence relationships in advance, the wavelength can be set appropriately, irrespectively of which ports in which terminal stations the optical transceivers 11 and 21 are connected to.

Other Example Embodiments

In the example embodiments described above, the functions of each unit of the optical transceivers are described, but it is sufficient for these functions to be achieved as an optical transceiver. Also, the example embodiments described above illustrate examples of the configuration of an optical communication system, but are not limited to the illustrated examples. Moreover, the various examples described in the example embodiments can be combined where appropriate.

Figure 9:
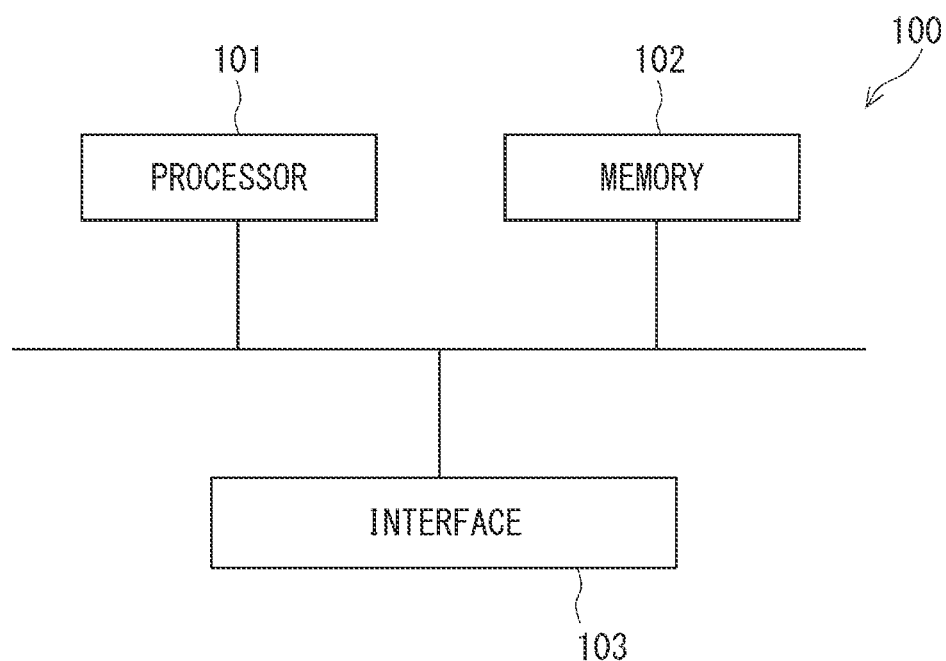
FIG. 9 is a diagram illustrating an example of a hardware configuration of a portion of an optical transceiver.

In addition, an optical transceiver according to the example embodiments may have a hardware configuration like the following. FIG. 9 is a diagram illustrating an example of a hardware configuration of a portion of an optical transceiver according to the example embodiments.

An optical transceiver 100 illustrated in FIG. 9 includes a processor 101, a memory 102, and an interface 103. The interface 103 may be an interface with respect to an optical output device and an optical input device not illustrated. The functions of each unit described in the example embodiments are achieved by having the processor 101 load a program stored in the memory 102, and execute the program while cooperating with the interface 103. The program may be the program described in the example embodiments.

In the example described above, the program may be stored and supplied to a computer by using a non-transitory computer readable medium of any type. The non-transitory computer readable medium includes a tangible storage medium of any type. Examples of the non-transitory computer readable medium include a magnetic recording medium (for example, a flexible disk, magnetic tape, or a hard disk drive) and a magneto-optical recording medium (for example, a magneto-optical disc). Further examples include Compact Disc-Read-Only Memory (CD-ROM), CD-R, and CD-R/W. Further examples include semiconductor memory (for example, mask ROM, programmable ROM (PROM), erasable PROM (EPROM), flash ROM, and random access memory (RAM)). Additionally, the program may also be supplied to the computer by a transitory computer readable medium of any type. Examples of the transitory computer readable medium include electrical signals, optical signals, and electromagnetic waves. The transitory computer readable medium can supply the program to the computer through a wired communication channel such as an electric cable or an optical fiber, or through a wireless communication channel.

Note that the present disclosure is not limited to the various example embodiments described above, and appropriate modifications are possible within a scope that does not depart from the gist. Moreover, the present disclosure may also be carried out by appropriately combining respective example embodiments.

All or part of the foregoing example embodiments may also be described like the following supplementary note, but are not limited to the following.
<Supplementary Note>
(Supplementary Note 1)

An optical communication system comprising:

a first optical transceiver configured to output a first optical signal;

a second optical transceiver opposing the first optical transceiver and configured to output a second optical signal; and an optical fiber that acts as a medium for carrying single-fiber bi-directional communication between the first optical transceiver and the second optical transceiver, wherein the first optical transceiver outputs the first optical signal to the optical fiber while switching a wavelength of the first optical signal, the second optical transceiver identifies the wavelength of the received first optical signal when the wavelength of the first optical signal is switched to a receivable wavelength, and outputs an optical signal having a wavelength determined on a basis of an identification result to the optical fiber as the second optical signal, and when the first optical transceiver receives the second optical signal from the optical fiber, the first optical transceiver stops switching the wavelength of the first optical signal.
(Supplementary Note 2)

The optical communication system according to Supplementary Note 1, wherein the first optical transceiver outputs the first optical signal including information indicating the wavelength of the first optical signal to the optical fiber, and the second optical transceiver identifies the wavelength of the received first optical signal on a basis of the information.
(Supplementary Note 3)

The optical communication system according to Supplementary Note 1 or 2, wherein the second optical transceiver includes a storing unit configured to store correspondence relationships between reception wavelengths and transmission wavelengths, and determines, on a basis of the identification result and the correspondence relationships, a transmission wavelength corresponding to a reception wavelength that matches the wavelength indicated by the identification result as the wavelength of the second optical signal.
(Supplementary Note 4)

The optical communication system according to Supplementary Note 1 or 2, wherein the first optical transceiver stops outputting the first optical signal in a case where the second optical signal is not received successfully from the optical fiber even after executing the wavelength switching a predetermined number of times, in a case where the second optical transceiver is connected after stopping the outputting of the first optical signal, the connected second optical transceiver outputs the second optical signal to the optical fiber while switching a wavelength of the second optical signal, the first optical transceiver identifies the wavelength of the received second optical signal when the wavelength of the second optical signal is switched to a receivable wavelength, and outputs an optical signal having a wavelength determined on a basis of an identification result to the optical fiber as the first optical signal, and when the second optical transceiver receives the first optical signal from the optical fiber, the second optical transceiver stops switching the wavelength of the second optical signal.

(Supplementary Note 5)

The optical communication system according to Supplementary Note 4, wherein the second optical transceiver includes a storing unit configured to store correspondence relationships between reception wavelengths and transmission wavelengths, and determines, on a basis of the identification result and the correspondence relationships, a transmission wavelength corresponding to a reception wavelength that matches the wavelength indicated by the identification result as the wavelength of the second optical signal, and the first optical transceiver includes a storing unit configured to store the correspondence relationships, and determines, on a basis of the identification result and the correspondence relationships, a transmission wavelength corresponding to a reception wavelength that matches the wavelength indicated by the identification result as the wavelength of the first optical signal.

(Supplementary Note 6)

The optical communication system according to any one of Supplementary Notes 1 to 5, further comprising a first multiplexer/demultiplexer that includes a transmitting port and a receiving port for connecting to the first optical transceiver, and a second multiplexer/demultiplexer that includes a transmitting port and a receiving port for connecting to the second optical transceiver, wherein the optical fiber is disposed between the first multiplexer/demultiplexer and the second multiplexer/demultiplexer, respective wavelengths that can be transmitted from the first optical transceiver and received by the first optical transceiver are prescribed according to the transmitting port and the receiving port of the first multiplexer/demultiplexer to which the first optical transceiver is connected, and respective wavelengths that can be transmitted from the second optical transceiver and received by the second optical transceiver are prescribed according to the transmitting port and the receiving port of the second multiplexer/demultiplexer to which the second optical transceiver is connected.

(Supplementary Note 7)

The optical communication system according to any one of Supplementary Notes 1 to 5, further comprising a first multiplexer/demultiplexer that includes a transmitting/receiving port for connecting to the first optical transceiver, and a second multiplexer/demultiplexer that includes a transmitting/receiving port for connecting to the second optical transceiver, wherein the optical fiber is disposed between the first multiplexer/demultiplexer and the second multiplexer/demultiplexer, a wavelength that can be transmitted and received by the first optical transceiver is prescribed according to the transmitting/receiving port of the first multiplexer/demultiplexer to which the first optical transceiver is connected, and a wavelength that can be transmitted and received by the second optical transceiver is prescribed according to the transmitting/receiving port of the second multiplexer/demultiplexer to which the second optical transceiver is connected.

(Supplementary Note 8)

An optical transceiver comprising:

an optical outputting unit configured to output a first optical signal to an optical fiber that acts as a medium for carrying single-fiber bi-directional communication between the optical transceiver itself and an opposing other optical transceiver;

a controlling unit configured to switch a wavelength of the first optical signal to be outputted by the optical outputting unit; and an optical inputting unit configured to input a second optical signal from the optical fiber, the second optical signal having a wavelength pre-associated with the wavelength of the first optical signal and outputted when the other optical transceiver received the first optical signal, wherein when the second optical signal is received by the optical inputting unit, the controlling unit stops switching the wavelength of the first optical signal.

(Supplementary Note 9)

The optical transceiver according to Supplementary Note 8, wherein the optical outputting unit outputs the first optical signal including information indicating the wavelength of the first optical signal to the optical fiber.

(Supplementary Note 10)

An optical transceiver comprising:

an optical inputting unit configured to input a first optical signal outputted while a wavelength of the first optical signal is switched, the first optical signal being outputted from an optical fiber that acts as a medium for carrying single-fiber bi-directional communication between the optical transceiver itself and an opposing other optical transceiver;

a controlling unit configured to identify the wavelength of the first optical signal successfully received by the optical inputting unit, and to determine a transmission wavelength on a basis of an identification result; and an optical outputting unit configured to output a second optical signal having the transmission wavelength determined by the controlling unit to the optical fiber.

(Supplementary Note 11)

The optical transceiver according to Supplementary Note 10, wherein the controlling unit identifies the wavelength of the first optical signal received from the other optical transceiver on a basis of information included in the first optical signal.

(Supplementary Note 12)

The optical transceiver according to Supplementary Note 10 or 11, wherein the controlling unit includes a storing unit configured to store correspondence relationships between reception wavelengths and transmission wavelengths, and determines, on a basis of the identification result and the correspondence relationships, a transmission wavelength corresponding to a reception wavelength that matches the wavelength indicated by the identification result as the transmission wavelength of the second optical signal.

(Supplementary Note 13)

An optical transceiver comprising:

an optical outputting unit configured to output a first optical signal to an optical fiber that acts as a medium for carrying single-fiber bi-directional communication between the optical transceiver itself and an opposing other optical transceiver;

a controlling unit configured to switch a wavelength of the first optical signal to be outputted by the optical outputting unit; and an optical inputting unit configured to input a second optical signal from the optical fiber, the second optical signal having a wavelength pre-associated with the wavelength of the first optical signal and outputted when the other optical transceiver received the first optical signal, wherein when the second optical signal is received by the optical inputting unit, the controlling unit stops switching the wavelength of the first optical signal, the optical inputting unit inputs a third optical signal outputted while a wavelength of the third optical signal is switched from the optical fiber, the controlling unit identifies the wavelength of the third optical signal successfully received by the optical inputting unit, and determines a transmission wavelength on a basis of an identification result, the optical outputting unit outputs a fourth optical signal having the transmission wavelength determined by the controlling unit to the optical fiber, the wavelength of the third optical signal that is receivable by the optical inputting unit is the wavelength of the second optical signal, and the wavelength of the fourth optical signal determined by the controlling unit is the wavelength of the first optical signal that is receivable by the other optical transceiver.

(Supplementary Note 14)

The optical transceiver according to Supplementary Note 13, wherein the optical outputting unit outputs the first optical signal including information indicating the wavelength of the first optical signal to the optical fiber, and the controlling unit identifies the wavelength of the third optical signal successfully received by the optical inputting unit on a basis of information included in the third optical signal.

(Supplementary Note 15)

The optical transceiver according to Supplementary Note 13 or 14, wherein the optical outputting unit stops outputting the first optical signal in a case where the second optical signal is not received successfully from the optical fiber even after executing the wavelength switching a predetermined number of times, and in a case where the third optical signal is received successfully by the optical inputting unit after the outputting of the first optical signal is stopped, the controlling unit identifies the wavelength of the third optical signal received successfully by the optical inputting unit.

(Supplementary Note 16)

The optical transceiver according to any one of Supplementary Notes 13 to 15, wherein the controlling unit includes a storing unit configured to store correspondence relationships between reception wavelengths and transmission wavelengths, and determines, on a basis of the identification result and the correspondence relationships, a transmission wavelength corresponding to a reception wavelength that matches the wavelength indicated by the identification result as the wavelength of the fourth optical signal.

(Supplementary Note 17)

The optical transceiver according to any one of Supplementary Notes 8 to 16, wherein the optical fiber is disposed between a first multiplexer/demultiplexer that includes a transmitting port and a receiving port for connecting to the optical transceiver, and a second multiplexer/demultiplexer that includes a transmitting port and a receiving port for connecting to the other optical transceiver, respective wavelengths that can be transmitted from the optical transceiver and received by the optical transceiver are prescribed according to the transmitting port and the receiving port of the first multiplexer/demultiplexer to which the optical transceiver is connected, and respective wavelengths that can be transmitted from the other optical transceiver and received by the other optical transceiver are prescribed according to the transmitting port and the receiving port of the second multiplexer/demultiplexer to which the other optical transceiver is connected.

(Supplementary Note 18)

The optical transceiver according to any one of Supplementary Notes 8 to 16, wherein the optical fiber is disposed between a first multiplexer/demultiplexer that includes a transmitting/receiving port for connecting to the optical transceiver, and a second multiplexer/demultiplexer that includes a transmitting/receiving port for connecting to the other optical transceiver, a wavelength that can be transmitted and received by the optical transceiver is prescribed according to the transmitting/receiving port of the first multiplexer/demultiplexer to which the optical transceiver is connected, and a wavelength that can be transmitted and received by the other optical transceiver is prescribed according to the transmitting/receiving port of the second multiplexer/demultiplexer to which the other optical transceiver is connected.

(Supplementary Note 19)

An optical communication method comprising:

a first outputting step, executed by a first optical transceiver, of outputting a first optical signal while switching a wavelength of the first optical signal to an optical fiber that acts as a medium for carrying single-fiber bi-directional communication between the first optical transceiver and an opposing second optical transceiver;

a second outputting step, executed by the second optical transceiver, of identifying the wavelength of the received first optical signal when the wavelength of the first optical signal is switched to a receivable wavelength, and outputting a second optical signal having a wavelength determined on a basis of an identification result to the optical fiber; and a stopping step, executed by the first optical transceiver when the first optical transceiver receives the second optical signal from the optical fiber, of stopping the switching of the wavelength of the first optical signal.

(Supplementary Note 20)

The optical communication method according to Supplementary Note 19, wherein the first outputting step outputs the first optical signal including information indicating the wavelength of the first optical signal to the optical fiber, and the second outputting step identifies the wavelength of the received first optical signal on a basis of the information.

(Supplementary Note 21)

The optical communication method according to Supplementary Note 19 or 20, wherein the second outputting step determines, on a basis of correspondence relationships between reception wavelengths and transmission wavelengths and the identification result, a transmission wavelength corresponding to a reception wavelength that matches the wavelength indicated by the identification result as the wavelength of the second optical signal.

(Supplementary Note 22)

The optical communication method according to Supplementary Note 19 or 20, further comprising:

a stopping step, executed by the first optical transceiver, of stopping the outputting of the first optical signal in a case where the second optical signal is not received successfully from the optical fiber even after executing the wavelength switching a predetermined number of times;

a third outputting step, executed by the second optical transceiver in a case where the second optical transceiver is connected after the outputting of the first optical signal is stopped, of outputting the second optical signal to the optical fiber while switching a wavelength of the second optical signal;

a fourth outputting step, executed by the first optical transceiver, of identifying the wavelength of the received second optical signal when the wavelength of the second optical signal is switched to a receivable wavelength, and outputting an optical signal having a wavelength determined on a basis of an identification result to the optical fiber as the first optical signal; and a stopping step, executed by the second optical transceiver when the second optical transceiver receives the first optical signal from the optical fiber, of stopping the switching of the wavelength of the second optical signal.

(Supplementary Note 23)

The optical communication method according to Supplementary Note 22, wherein the second outputting step determines, on a basis of correspondence relationships between reception wavelengths and transmission wavelengths and the identification result, a transmission wavelength corresponding to a reception wavelength that matches the wavelength indicated by the identification result as the wavelength of the second optical signal, and the fourth outputting step determines, on a basis of the correspondence relationships and the identification result, a transmission wavelength corresponding to a reception wavelength that matches the wavelength indicated by the identification result as the wavelength of the first optical signal.

(Supplementary Note 24)

The optical communication method according to any one of Supplementary Notes 19 to 23, wherein the optical fiber is disposed between a first multiplexer/demultiplexer that includes a transmitting port and a receiving port for connecting to the first optical transceiver, and a second multiplexer/demultiplexer that includes a transmitting port and a receiving port for connecting to the second optical transceiver, respective wavelengths that can be transmitted from the first optical transceiver and received by the first optical transceiver are prescribed according to the transmitting port and the receiving port of the first multiplexer/demultiplexer to which the first optical transceiver is connected, and respective wavelengths that can be transmitted from the second optical transceiver and received by the second optical transceiver are prescribed according to the transmitting port and the receiving port of the second multiplexer/demultiplexer to which the second optical transceiver is connected.

(Supplementary Note 25)

The optical communication method according to any one of Supplementary Notes 19 to 23, wherein the optical fiber is disposed between a first multiplexer/demultiplexer that includes a transmitting/receiving port for connecting to the first optical transceiver, and a second multiplexer/demultiplexer that includes a transmitting/receiving port for connecting to the second optical transceiver, a wavelength that can be transmitted and received by the first optical transceiver is prescribed according to the transmitting/receiving port of the first multiplexer/demultiplexer to which the first optical transceiver is connected, and a wavelength that can be transmitted and received by the second optical transceiver is prescribed according to the transmitting/receiving port of the second multiplexer/demultiplexer to which the second optical transceiver is connected.

(Supplementary Note 26)

A program causing a control computer provided in an optical transceiver to execute a process comprising:

a switching step of switching a wavelength of a first optical signal to be outputted to an optical fiber that acts as a medium for carrying single-fiber bi-directional communication between the optical transceiver and an opposing other optical transceiver; and a stopping step of stopping the switching of the wavelength of the first optical signal when the second optical signal having a wavelength pre-associated with the wavelength of the first optical signal and outputted when the other optical transceiver received the first optical signal is received.

(Supplementary Note 27)

The program according to Supplementary Note 26 wherein the switching step includes a step of including information indicating the wavelength of the first optical signal in the first optical signal.

(Supplementary Note 28)

A program causing a control computer provided in an optical transceiver to execute a process comprising:

an identifying step of identifying a wavelength of a received first optical signal when the first optical signal outputted while switching the wavelength of the first optical signal is received from an optical fiber that acts as a medium for carrying single-fiber bi-directional communication between the optical transceiver and an opposing other optical transceiver;

a determining step of determining a transmission wavelength on a basis of an identification result from the identifying step; and a switching step of switching a wavelength of a second optical signal to be outputted to the optical fiber such that the wavelength of the second optical signal is the transmission wavelength determined in the determining step.

(Supplementary Note 29)

The program according to Supplementary Note 28, wherein the identifying step identifies the wavelength of the first optical signal received from the other optical transceiver on a basis of information included in the first optical signal.

(Supplementary Note 30)

The program according to Supplementary Note 28 or 29, wherein the determining step determines, on a basis of correspondence relationships between reception wavelengths and transmission wavelengths and the identification result, a transmission wavelength corresponding to a reception wavelength that matches the wavelength indicated by the identification result as the transmission wavelength of the second optical signal.

(Supplementary Note 31)

A program causing a control computer provided in an optical transceiver to execute a process comprising:

a first switching step of switching a wavelength of a first optical signal to be outputted to an optical fiber that acts as a medium for carrying single-fiber bi-directional communication between the optical transceiver and an opposing other optical transceiver;

a stopping step of stopping the switching of the wavelength of the first optical signal when the second optical signal having a wavelength pre-associated with the wavelength of the first optical signal and outputted when the other optical transceiver received the first optical signal is received;

an identifying step of identifying a wavelength of a received third optical signal when the third optical signal outputted while switching the wavelength of the third optical signal is received from the optical fiber;

a determining step of determining a transmission wavelength on a basis of an identification result from the identifying step; and a second switching step of switching a wavelength of a fourth optical signal to be outputted to the optical fiber such that the wavelength of the fourth optical signal is the transmission wavelength determined in the determining step, wherein the wavelength of the third optical signal that is receivable from the optical fiber is the wavelength of the second optical signal, and the wavelength of the fourth optical signal determined in the determining step is the wavelength of the first optical signal that is receivable by the other optical transceiver.

(Supplementary Note 32)

The program according to Supplementary Note 31, wherein the first switching step includes a step of including information indicating the wavelength of the first optical signal in the first optical signal, and the identifying step identifies the wavelength of the third optical signal received from the other optical transceiver on a basis of information included in the third optical signal.

(Supplementary Note 33)

The program according to Supplementary Note 31 or 32, wherein the first switching step includes a stopping step of stopping the outputting of the first optical signal in a case where the second optical signal is not received successfully from the optical fiber even after executing the wavelength switching a predetermined number of times, and in a case where the third optical signal is received successfully from the optical fiber after the outputting of the first optical signal is stopped, the identifying step identifies the wavelength of the successfully received third optical signal.

(Supplementary Note 34)

The program according to any one of Supplementary Notes 31 to 33, wherein the determining step determines, on a basis of correspondence relationships between reception wavelengths and transmission wavelengths and the identification result, a transmission wavelength corresponding to a reception wavelength that matches the wavelength indicated by the identification result as the wavelength of the fourth optical signal.

The present invention has been described with reference to exemplary embodiments, but the present invention is not limited by the foregoing. The configuration and details of the present invention may be subjected to various modifications that would occur to persons skilled in the art within the scope of the invention.

This application claims priority to Japanese Patent Application No. 2019-061886 filed in the Japan Patent Office on Mar. 27, 2019, the disclosure of which is incorporated by reference in its entirety.

REFERENCE SIGNS LIST 1, 11-1 first optical transceiver
1a, 2a control unit
1b, 2b optical output unit
1c, 2c optical input unit
2, 21-n second optical transceiver
3 optical fiber
10 first terminal station
11, 11-2, 11-n first terminal station-side optical transceiver
12 first multiplexer/demultiplexer
20 second terminal station
21, 21-2 second terminal station-side optical transceiver
22 second multiplexer/demultiplexer
50 table
100 optical transceiver
101 processor
102 memory
103 interface

What is claimed is:

1. An optical communication system comprising:

a first optical transceiver configured to output a first optical signal;

a second optical transceiver opposing the first optical transceiver and configured to output a second optical signal; and an optical fiber that acts as a medium for carrying single-fiber bi-directional communication between the first optical transceiver and the second optical transceiver, wherein the first optical transceiver outputs the first optical signal to the optical fiber while switching a wavelength of the first optical signal, the second optical transceiver identifies the wavelength of the received first optical signal when the wavelength of the first optical signal is switched to a receivable wavelength, and outputs an optical signal having a wavelength determined on a basis of an identification result to the optical fiber as the second optical signal, when the first optical transceiver receives the second optical signal from the optical fiber, the first optical transceiver stops switching the wavelength of the first optical signal, the first optical transceiver stops outputting the first optical signal in a case where the second optical signal is not received successfully from the optical fiber even after switching the wavelength of the first optical signal a predetermined number of times, in a case where the second optical transceiver is connected after stopping the outputting of the first optical signal, the connected second optical transceiver outputs the second optical signal to the optical fiber while switching a wavelength of the second optical signal, the first optical transceiver identifies the wavelength of the received second optical signal when the wavelength of the second optical signal is switched to the receivable wavelength, and outputs an optical signal having a wavelength determined on a basis of an identification result to the optical fiber as the first optical signal, and when the second optical transceiver receives the first optical signal from the optical fiber, the second optical transceiver stops switching the wavelength of the second optical signal.

2. The optical communication system according to claim 1, wherein the first optical transceiver outputs the first optical signal including information indicating the wavelength of the first optical signal to the optical fiber, and the second optical transceiver identifies the wavelength of the received first optical signal on a basis of the information.

3. The optical communication system according to claim 1, wherein the second optical transceiver includes a storing unit configured to store correspondence relationships between reception wavelengths and transmission wavelengths, and determines, on a basis of the identification result and the correspondence relationships, a transmission wavelength corresponding to a reception wavelength that matches the wavelength indicated by the identification result as the wavelength of the second optical signal, and the first optical transceiver includes a storing unit configured to store the correspondence relationships, and determines, on a basis of the identification result and the correspondence relationships, a transmission wavelength corresponding to a reception wavelength that matches the wavelength indicated by the identification result as the wavelength of the first optical signal.

4. The optical communication system according to claim 1, further comprising a first multiplexer/demultiplexer that includes a transmitting port and a receiving port for connecting to the first optical transceiver, and a second multiplexer/demultiplexer that includes a transmitting port and a receiving port for connecting to the second optical transceiver, wherein the optical fiber is disposed between the first multiplexer/demultiplexer and the second multiplexer/demultiplexer, respective wavelengths that can be transmitted from the first optical transceiver and received by the first optical transceiver are prescribed according to the transmitting port and the receiving port of the first multiplexer/demultiplexer to which the first optical transceiver is connected, and respective wavelengths that can be transmitted from the second optical transceiver and received by the second optical transceiver are prescribed according to the transmitting port and the receiving port of the second multiplexer/demultiplexer to which the second optical transceiver is connected.

5. The optical communication system according to claim 1, further comprising a first multiplexer/demultiplexer that includes a transmitting/receiving port for connecting to the first optical transceiver, and a second multiplexer/demultiplexer that includes a transmitting/receiving port for connecting to the second optical transceiver, wherein the optical fiber is disposed between the first multiplexer/demultiplexer and the second multiplexer/demultiplexer, a wavelength that can be transmitted and received by the first optical transceiver is prescribed according to the transmitting/receiving port of the first multiplexer/demultiplexer to which the first optical transceiver is connected, and a wavelength that can be transmitted and received by the second optical transceiver is prescribed according to the transmitting/receiving port of the second multiplexer/demultiplexer to which the second optical transceiver is connected.

6. A first optical transceiver in the optical communication system according to claim 1.

7. A second optical transceiver in the optical communication system according to claim 1.

8. An optical communication method comprising:

by a first optical transceiver, first outputting a first optical signal while switching a wavelength of the first optical signal to an optical fiber that acts as a medium for carrying single-fiber bi-directional communication between the first optical transceiver and an opposing second optical transceiver;

by the second optical transceiver, identifying the wavelength of the received first optical signal when the wavelength of the first optical signal is switched to a receivable wavelength, and second outputting a second optical signal having a wavelength determined on a basis of an identification result to the optical fiber;

by the first optical transceiver when the first optical transceiver receives the second optical signal from the optical fiber, stopping the switching of the wavelength of the first optical signal;

by the first optical transceiver, stopping the outputting of the first optical signal in a case where the second optical signal is not received successfully from the optical fiber even after switching the wavelength of the first optical signal a predetermined number of times;

in a case where the second optical transceiver is connected after the outputting of the first optical signal is stopped, by the second optical transceiver, third outputting the second optical signal to the optical fiber while switching a wavelength of the second optical signal;

by the first optical transceiver, identifying the wavelength of the received second optical signal when the wavelength of the second optical signal is switched to the receivable wavelength, and fourth outputting an optical signal having a wavelength determined on a basis of an identification result to the optical fiber as the first optical signal; and by the second optical transceiver when the second optical transceiver receives the first optical signal from the optical fiber, stopping the switching of the wavelength of the second optical signal.

9. The optical communication method according to claim 8, wherein the first outputting outputs the first optical signal including information indicating the wavelength of the first optical signal to the optical fiber, and the identifying identifies the wavelength of the received first optical signal on a basis of the information.

10. The optical communication method according to claim 8, wherein the second outputting determines, on a basis of correspondence relationships between reception wavelengths and transmission wavelengths and the identification result, a transmission wavelength corresponding to a reception wavelength that matches the wavelength indicated by the identification result as the wavelength of the second optical signal, and the fourth outputting determines, on a basis of the correspondence relationships and the identification result, a transmission wavelength corresponding to a reception wavelength that matches the wavelength indicated by the identification result as the wavelength of the first optical signal.

11. The optical communication method according to claim 8, wherein the optical fiber is disposed between a first multiplexer/demultiplexer that includes a transmitting port and a receiving port for connecting to the first optical transceiver, and a second multiplexer/demultiplexer that includes a transmitting port and a receiving port for connecting to the second optical transceiver, respective wavelengths that can be transmitted from the first optical transceiver and received by the first optical transceiver are prescribed according to the transmitting port and the receiving port of the first multiplexer/demultiplexer to which the first optical transceiver is connected, and respective wavelengths that can be transmitted from the second optical transceiver and received by the second optical transceiver are prescribed according to the transmitting port and the receiving port of the second multiplexer/demultiplexer to which the second optical transceiver is connected.

12. The optical communication method according to claim 8, wherein the optical fiber is disposed between a first multiplexer/demultiplexer that includes a transmitting/receiving port for connecting to the first optical transceiver, and a second multiplexer/demultiplexer that includes a transmitting/receiving port for connecting to the second optical transceiver, a wavelength that can be transmitted and received by the first optical transceiver is prescribed according to the transmitting/receiving port of the first multiplexer/demultiplexer to which the first optical transceiver is connected, and a wavelength that can be transmitted and received by the second optical transceiver is prescribed according to the transmitting/receiving port of the second multiplexer/demultiplexer to which the second optical transceiver is connected.

13. A non-transitory computer readable medium storing a first program causing a control computer provided in an optical transceiver to execute a first process comprising:

switching a wavelength of a first optical signal to be outputted to an optical fiber that acts as a medium for carrying single-fiber bi-directional communication between the optical transceiver and an opposing other optical transceiver;

stopping the switching of the wavelength of the first optical signal when the second optical signal having a wavelength pre-associated with the wavelength of the first optical signal and outputted when the other optical transceiver received the first optical signal is received;

stopping the outputting of the first optical signal in a case where the second optical signal is not received successfully from the optical fiber even after switching the wavelength of the first optical signal a predetermined number of times; and identifying the wavelength of the received second optical signal when the wavelength of the second optical signal is switched to a receivable wavelength after the outputting of the first optical signal is stopped, and outputting an optical signal having a wavelength determined on a basis of an identification result to the optical fiber as the first optical signal.

14. The non-transitory computer readable medium according to claim 13 wherein the switching includes including information indicating the wavelength of the first optical signal in the first optical signal.

15. The non-transitory computer readable medium according to claim 13, further storing a second program causing a control computer provided in the other optical transceiver to execute a second process comprising:

identifying a wavelength of a received first optical signal when the first optical signal outputted while switching the wavelength of the first optical signal is received from the optical fiber;

determining a transmission wavelength on a basis of an identification result from the identifying;

switching a wavelength of a second optical signal to be outputted to the optical fiber such that the wavelength of the second optical signal is the transmission wavelength determined in the determining; and in a case where the other optical transceiver is connected after the outputting of the first optical signal is stopped, outputting the second optical signal to the optical fiber while switching the wavelength of the second optical signal, and stopping the switching of the wavelength of the second optical signal when the first optical signal is received from the optical fiber.

16. The non-transitory computer readable medium according to claim 15, wherein the identifying identifies the wavelength of the first optical signal received from the optical transceiver on a basis of information included in the first optical signal.

\* \* \* \* \*